(12) United States Patent
Karagiannis et al.

(10) Patent No.: US 7,399,525 B2
(45) Date of Patent: Jul. 15, 2008

(54) POLYMER SHEETS COMPRISING A FLUOROPOLYMER

(75) Inventors: Aristotelis Karagiannis, Amherst, MA (US); Yinong Ma, Longmeadow, MA (US); Julia Claire Schimmelpenningh, North Brookfield, MA (US)

(73) Assignee: Solutia Incorporated, St. Louis, MO (US)

( * ) Notice: Subject to any disclaimer, the term of this patent is extended or adjusted under 35 U.S.C. 154(b) by 396 days.

(21) Appl. No.: 10/978,441

(22) Filed: Nov. 2, 2004

(65) Prior Publication Data

US 2006/0093830 A1    May 4, 2006

(51) Int. Cl.
B32B 17/10    (2006.01)
B32B 27/08    (2006.01)
B32B 27/36    (2006.01)
B32B 27/42    (2006.01)

(52) U.S. Cl. .................. 428/339; 428/421; 428/437; 428/447; 428/448; 428/480; 428/524

(58) Field of Classification Search ................. 428/421, 428/437, 447, 448, 480, 524, 339
See application file for complete search history.

(56) References Cited

U.S. PATENT DOCUMENTS

| | | | |
|---|---|---|---|
| 2,430,053 A | 11/1947 | Hershberger | |
| 3,132,123 A | 5/1964 | Harris | |
| 3,235,537 A | 2/1966 | Albin | |
| 3,282,712 A | 11/1966 | Tashiro | |
| 3,388,033 A | 6/1968 | Buckley et al. | |
| 3,528,954 A | 9/1970 | Carlson | |
| 3,539,442 A | 11/1970 | Buckley et. al. | |
| 3,619,246 A * | 11/1971 | Bragole | 428/422 |
| 3,635,926 A | 1/1972 | Gresham | |
| 3,642,742 A | 2/1972 | Carlson | |
| 3,723,320 A | 3/1973 | Herber | |
| 3,841,890 A | 10/1974 | Coaker | |
| 3,900,673 A * | 8/1975 | Mattimoe et al. | 428/339 |
| 4,029,868 A | 6/1977 | Carlson | |
| 4,107,366 A * | 8/1978 | Rieser et al. | 428/215 |
| 4,206,067 A | 6/1980 | MacKinnon | |
| 4,485,601 A | 12/1984 | De Boel | |
| 4,623,592 A | 11/1986 | Daude | |
| 4,654,268 A | 3/1987 | De Boel | |
| 4,681,810 A | 7/1987 | Gomez | |
| 4,704,418 A | 11/1987 | Gomez | |
| 4,707,304 A | 11/1987 | Gomez | |
| 4,945,015 A | 7/1990 | Milner | |
| 5,118,540 A * | 6/1992 | Hutchison | 428/40.7 |
| 5,239,406 A | 8/1993 | Lynam | |
| RE34,523 E | 1/1994 | Daude | |
| 5,434,006 A | 7/1995 | Goelff | |
| 5,523,877 A | 6/1996 | Lynam | |
| 5,604,626 A | 2/1997 | Teowee | |
| 5,631,315 A | 5/1997 | D'Errico | |
| 5,838,483 A | 11/1998 | Teowee | |
| 5,864,419 A | 1/1999 | Lynam | |
| 5,908,704 A | 6/1999 | Friedman | |
| 5,952,408 A | 9/1999 | Lee | |
| 5,986,797 A | 11/1999 | Lynam | |
| 6,042,928 A * | 3/2000 | Suzuki et al. | 428/141 |
| 6,083,428 A | 7/2000 | Ueda | |
| 6,122,093 A | 9/2000 | Lynam | |
| 6,159,606 A | 12/2000 | Gelderie | |
| 6,178,034 B1 | 1/2001 | Allemand | |
| 6,246,505 B1 | 6/2001 | Teowee | |
| 6,268,415 B1 * | 7/2001 | Renz et al. | 524/91 |
| 6,479,155 B1 | 11/2002 | Gelderie | |
| 6,726,979 B2 | 4/2004 | Friedman | |
| 6,797,396 B1 | 9/2004 | Liu | |
| 2002/0041424 A1 | 4/2002 | Lynam | |
| 2002/0151632 A1 | 10/2002 | Tarnawskyj | |
| 2003/0162028 A1 | 8/2003 | Friedman | |
| 2004/0004778 A1 | 1/2004 | Liu | |

FOREIGN PATENT DOCUMENTS

| | | |
|---|---|---|
| GB | 1033322 | 6/1966 |
| JP | 03203640 | 9/1991 |
| JP | 08174775 | 12/1994 |
| JP | 2000-167988 | 6/2000 |
| WO | WO 2005/082617 A1 | 9/2005 |

\* cited by examiner

*Primary Examiner*—Ramsey Zacharia
(74) *Attorney, Agent, or Firm*—Brenc Law

(57) ABSTRACT

The present invention is in the field of interlayers for use in multiple layer glass panels, and more specifically, the present invention is in the field of interlayers comprising a fluoropolymer sheet and a nonfluoropolymer polymer sheet.

10 Claims, No Drawings

POLYMER SHEETS COMPRISING A FLUOROPOLYMER

FIELD OF THE INVENTION

The present invention is in the field of interlayers for use in multiple layer glass panels, and more specifically, the present invention is in the field of interlayers comprising a fluoropolymer sheet and a nonfluoropolymer polymer sheet.

BACKGROUND

Poly(vinyl butyral) (PVB) is commonly used in the manufacture of polymer sheets that can be used as interlayers in light-transmitting laminates such as safety glass or polymeric laminates. Safety glass typically refers to a transparent laminate comprising a poly(vinyl butyral) sheet disposed between two panes of glass. Safety glass often is used to provide a transparent barrier in architectural and automotive openings. Its main function is to absorb energy, such as that caused by a blow from an object, without allowing penetration through the opening.

Safety glass can be formed by a process in which two layers of glass and a plastic interlayer, such as poly(vinyl butyral), are assembled into a pre-press, tacked into a pre-laminate, and finished into an optically clear laminate. The assembly phase can involve laying down a piece of glass, overlaying a poly(vinyl butyral) sheet on that glass, laying down a second piece of glass on the poly(vinyl butyral) sheet, and then trimming the excess poly(vinyl butyral) to the edges of the glass layers.

The plastic interlayer can be produced by mixing poly(vinyl butyral) polymer with one or more plasticizers, and optionally with one or more other ingredients, and melt processing the mix into sheeting, which can be collected and rolled for storage and transportation.

In addition to various common uses for laminated glass structures having a conventional polymer sheet type interlayer, in some applications of laminated safety glass it is particularly desirable to have additional fire retardation features. Examples of attempts to include some measure of fire retardation include the inclusion of additional layers of intumescent material that are specifically designed to char when subjected to flames, thereby preventing the further spread of a fire through the charred layer (U.S. Pat. No. 4,485,601). Additional protection, however, is often desirable.

Accordingly, there is a need in the art for multiple layer glass panels and interlayers used therein that provide the desired fire resistance while also allowing for the facile manufacture of a polymer sheet without adversely affecting other desirable properties.

SUMMARY OF THE INVENTION

Now, according to the present invention, it has surprisingly been discovered that various fluoropolymer sheets can be used in combination with nonfluoropolymer polymer sheets to provide fire resistance to multiple layer glass panels such as those used in architectural and automotive applications.

The present invention includes a multiple layer glass panel interlayer, comprising: a fluoropolymer sheet; and, a nonfluoropolymer polymer sheet.

The present invention includes a method of manufacturing a multiple layer glass panel interlayer, comprising: forming a multiple layer stack, wherein said multiple layer stack comprises a fluoropolymer sheet; and, laminating said stack to form said interlayer.

The present invention includes a multiple layer glass panel, comprising a multiple layer glass panel interlayer, wherein said interlayer comprises: a fluoropolymer sheet; and, a nonfluoropolymer polymer sheet.

DETAILED DESCRIPTION

According to the present invention, it has surprisingly been discovered that a fluoropolymer sheet and a nonfluoropolymer sheet can be incorporated into an interlayer for use in multiple layer glass panels for imparting fire resistance to the interlayer without unnecessarily complicating the panel structure. Whereas prior art attempts to incorporate fire resistance to multiple layer glass panels have included the use of fluoropolymer layers (U.S. Pat. No. 5,908,704), and also have included the use of fire resistant nonfluoropolymer polymer sheet layers (see, for example, U.S. Pat. No. 4,707,304), the present invention discloses the use of the two together in a single interlayer.

As used herein, a "fluoropolymer" means any fluorocarbon polymer composition that can be formed into a suitable layer (for example, optically acceptable and compatible with other components) for use in a multiple layer glass panel interlayer, and a "fluoropolymer sheet" is any layer formed from a fluoropolymer that is suitable for use as an interlayer or part of an interlayer. Examples of suitable fluoropolymers include, without limitation, tetrafluoroethylene/hexafluoropropylene/vinylidene fluoride (THV) and blends of THV with other polymers, specifically other fluoropolymers. Particularly useful THV and THV blends that can be used in these embodiments, as well as methods of making them, include those disclosed in U.S. Pat. No. 5,908,704 and in U.S. Pat. Nos. 3,235,537; 3,132,123; 3,635,926; 3,528,954; 3,642,742; and 4,029,868. An example of a fluoropolymer sheet that is commercially available is Fluoroju (available from Mitsubishi Plastics Inc., Tokyo Japan).

In various embodiments, the fluorocarbon composition comprises at least 75, 80, or 85 weight % of THV polymer. The THV polymers can be block or graft copolymers consisting of an elastomeric soft segment (i.e., hexafluoropropylene and vinylidene fluoride) and a fluroplastic hard segment (i.e., tetrafluoroethylene). The THV polymers are commercially available polymers comprising chloroethylene tetrafluoroethylene copolymer (ECTFE), hexafluoropropylene (HFP), and vinylidene fluoride (VDF) at a molar ratio of, for example, about 42-60:20-18:38-22 of ECTFE:HFP:VDF. Other blends of THV with other fluoropolymers can be used including, but not limited to, THV blended with fluorinated ethylene-propylene copolymers (FEP), perfluoroalkoxy polymer (PFA), perchlorotetrafluoroethylene (PCFE), ethylene-tetrafluoroethylene copolymer (ETFE), polyvinylidine fluoropolymer (PVDF), chloroethylene tetrafluoroethylene, and dichloroethylene tetrafluoroethylene (ECCTFE).

The THV resins used to form fluoropolymer sheets can be, for example, resin grade molecular weights ranging from 200,000 to 500,000, and resins having a polymer melting range of about 115-125° C. and comprising about 42 mole percent ECTFE and resins having a polymer melting range of about 165-180° C. and comprising about 60 mole percent ECTFE, depending, of course, on the desired application.

One or more adhesive agents, also known as a primer coatings or coupling agents, may be used on any surface onto which a fluoropolymer sheet is bonded or on the surface of the fluoropolymer sheet, or may be included in the fluoropolymer in bulk during sheet formation. Fluoropolymer sheets of the present invention can comprise coupling agents at concentrations of, for example, from 0.1% to 2.0%, 0.7% to 1.5%, or from 0.5% to 1.7% by weight. For example, silane and/or siloxane coupling agents can be used to improve adhesion of the fluoropolymer sheet to glass. In various embodiments, a vinyl triethoxy silane (VTES) is used as an adhesive agent.

Other additives, such as pigments, coloring agents, or concentrates and IR- or UV-light blockers, can be incorporated into fluoropolymer sheets of the present invention to suit a particular application.

Fluoropolymer sheets of the present invention can be any suitable thickness, and in various embodiments, can be 0.1 to 1.5 mm, 0.125 to 1.0 mm, or 0.125 to 0.5 mm.

Fluoropolymer sheets of the present invention can be manufactured using any conventional process, including melt extruding into a film. For example, flat extrusion dies and casting rolls or drums can be used to form and cool a fluoropolymer sheet.

As used herein, a "nonfluoropolymer polymer sheet" means a polymer sheet that is suitable for use in a multiple layer glass panel that contains no, or essentially no, fluorocarbon component. For example, as will be described in detail below, a nonfluoropolymer polymer sheet can comprise plasticized poly(vinyl butyral). In addition to a thermoplastic polymer component, a nonfluoropolymer polymer sheet can comprise further agents, as detailed below, for various purposes, for example, adhesion control agents and infrared absorbing agents can be added. In various embodiments, for example, one or more acid scavenger agents, which are described in detail below, can be added to the nonfluoropolymer polymer sheet to impart additional stability.

In various embodiments of the present invention, an interlayer for use in a multiple layer glass panel comprises a fluoropolymer sheet and a nonfluoropolymer polymer sheet. In various embodiments a fluoropolymer sheet and a nonfluoropolymer sheet are disposed in direct contact with each other to form a two layer interlayer. These interlayers can be formed, for example, by laminating the two layers directly, or by using an adhesive agent to improve the bonding between the two layers. These two layer constructs can be disposed directly between two glass panels to form a multiple layer glass panel.

In further embodiments, additional layers can be added to the two layer construct just described. For example, further fluoropolymer sheets and/or nonfluoropolymer sheets can be added to create multiple layer interlayers having three or more sheet layers. The additional layers can be added in any suitable arrangement, and can be the same or different as the other layers.

In yet further embodiments, a polymer film is included in an interlayer of the present invention. Polymer films, as will be described in detail below, can comprise any suitable polymer, such as poly(ethylene terephthalate). A polymer film can be included between a fluoropolymer sheet and a nonfluoropolymer polymer sheet, for example, or between two similar layers, for example between two fluoropolymer sheets or two nonfluoropolymer sheets. In some embodiments, more than one polymer film can be used, and additional polymer films can be the same or different from the first.

In various embodiments, a reinforcement mesh can be incorporated into an interlayer of the present invention, either within a fluoropolymer sheet, between two fluoropolymer sheets, or between a fluoropolymer sheet and a nonfluoropolymer sheet. For example, a glass fiber mesh, fluoropolymer fiber mesh, poly(ethylene terephthalate) fiber mesh, or a metallic mesh, as disclosed, for example, in U.S. Pat. Nos. 4,978,405 or 5,908,704 can be used. The mesh may be in the form of a woven, nonwoven, knitted, and hybrid mesh. Also useful are perforated sheets of the reinforcing materials, sized to permit the sheet to be embedded within the interlayer film during assembly of the laminate. The reinforcement layer can be, for example, 0.025 to 0.51 mm in thickness.

In various embodiments of the present invention, nonfluoropolymer polymer sheets can comprise conventional safety glass interlayer components, such as a plasticizer, thermoplastic polymer, and optical performance additives, and can further comprise agents that offer fire resistant character to the sheet. Nonfluoropolymer polymer sheets that comprise such fire resistant agents are particularly useful in interlayers of the present invention, because the combination of a fire resistant fluoropolymer sheet and nonfluoropolymer polymer sheet comprising fire resistant agents offer additional fire protection in the finished product.

Nonfluoropolymer polymer sheets used in interlayers of the present invention can comprise as a fire resistant agent a phosphate ester or phosphate ester blend, for example, monomeric phosphate esters (phosphate esters having one phosphate group), polyphosphate esters (phosphate esters having more than one phosphate group), or combinations thereof, which can be added to a nonfluoropolymer polymer sheet as a plasticizer in place of, or in addition to, any non-fire resistant plasticizer used. In these combinations, the total plasticizer content can be 5-80 phr, 10-70 phr, 15-60 phr, or 20-50 phr, and the phosphate ester can comprise at least 10%, 20%, 30%, 40%, 50%, or 75% of the plasticizer mix on a weight per weight basis.

Monomeric phosphate esters that can be used in plasticizer blends of the nonfluoropolymer polymer sheets of the present invention include monomeric phosphate esters having the formula $$R_3PO_4$$

wherein R is selected from the group consisting of aryl, alkaryl wherein the alkyl group contains from 1 to 3 carbon atoms, alkyl of from 1 to 12 carbon atoms, alkoxyalkyl of from 1 to 9 carbon atoms and cycloalkyl, with the proviso that when all of the radicals represented by R in a given compound are alkyl radicals, it is preferred that each alkyl radical has 4 or more carbon atoms. It is possible for R to represent different radicals in the same phosphate plasticizer.

Examples of suitable phosphates include tri-n-butyl phosphate, triisobutyl phosphate, triphenyl phosphate, tri-cresyl phosphate, tri-2,3-xylyl phosphate, trimesityl phosphate, methyl diphenyl phosphate, dimethyl phenylphosphate, ethyl di-cresyl phosphate, tripentyl phosphate, trihexyl phosphate, pentyl dihexyl phosphate, octyl diphenyl phosphate, trioctyl phosphate, octyl di-p-cresyl phosphate, tri-cyclohexyl phosphate, cyclohexyl diphenyl phosphate, dicyclohexyl phenyl phosphate, trinonyl phosphate, hexyl phenyl cresyl phosphate, 2-methylpentyl phenyl cresyl phosphate, octylphenyl cresyl phosphate, 2-ethylhexyl phenyl cresyl phosphate, n-octyl phenyl cresyl phosphate, nonyl phenyl cresyl phosphate, n-decyl phenyl cresyl phosphate, lauryl phenyl cresyl phosphate, butoxyethyl phenyl cresyl phosphate, 2-methylpentoxyethyl phenyl cresyl phosphate, hexoxyethyl phenyl cresylphosphate, octoxyethyl phenyl cresyl phosphate, 2-ethylhexyloxyethyl phenyl cresyl phosphate, nonyloxyethyl phenyl cresyl phosphate, decyloxyethyl phenyl cresyl phosphate, lauroxyethyl phenyl cresylphosphate, hexyl dicresyl phosphate, 2-ethylbutyl diphenyl phosphate, 2-methylpentyl dicresyl phosphate, n-hexyl diphenyl phosphate, octyl dicresyl phosphate, 2-ethylhexyl-dicresyl phosphate, iso-octyl dicresyl phosphate, n-octyl diphenyl phosphate, 2-ethylhexyl diphenyl phosphate, iso-octyl diphenyl phosphate, nonyl diphenyl phosphate, trimethylhexyl diphenyl phosphate, nonyl dicresyl phosphate, n-decyl diphenyl phosphate, decyl dicresyl phosphate, lauryl diphenyl phosphate, dodecyl dicresyl phosphate, 2-ethylhexyl methyl phenyl phosphate, 2-ethylhexyl iso-butyl-p-chlorophenyl phosphate, n-octyl n-butyl phenyl phosphate, 2-ethylhexyl isobutylphenyl phosphate, 2-ethylhexyl n-butyl phenyl phosphate, 2-ethylhexyl sec-butyl cresyl phosphate, 2-ethylhexyl n-butyl cresyl phosphate, di(2-ethylhexyl) phenyl phosphate, 2-ethylhexyl capryl phenyl phosphate, 2-ethylhexyl 2butyloctyl cresyl phosphate, n-butyl sec-tetradecyl phenyl phosphate, n-hexadecyl isopropyl phenyl phosphate, dodecyldiphenyl phosphate, tri-2-ethylhexyl phosphate, cresyl diphenyl phosphate, and mixtures of the foregoing, among others.

In various embodiments, monomeric phosphate esters that contain from 12 to 30 carbon atoms are used. Examples of these are trioctyl phosphate (especially tri-2-ethylhexyl phosphate), 2-ethylhexyl diphenyl phosphate, tricresyl phosphate, dodecyldiphenyl phosphate, tri-butoxyethyl phosphate and cresyl diphenyl phosphate.

As indicated above, higher order phosphate esters can also be used in nonfluoropolymer polymer sheets of the present invention. As used herein, a higher order phosphate ester is any phosphate ester having more than one phosphate group, which can also be described as a polyphosphate ester. In various embodiments, the polyphosphate ester is a diphosphate ester. In various embodiments, the polyphosphate ester is an oligomeric diphosphate ester.

In various embodiments, a nonfluoropolymer polymer sheet of the present invention comprises a polyphosphate ester having the following structure:

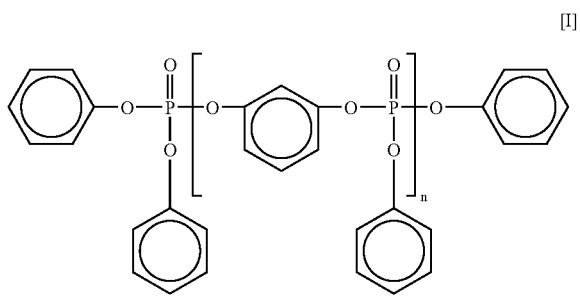

[I]

wherein n is 1 to 7. In various embodiments, n is 1.

In various embodiments, a polymer sheet of the present invention comprises a polyphosphate ester having the following structure:

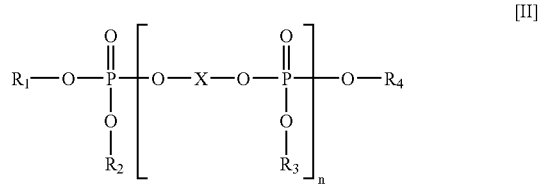

[II]

wherein $R_1$, $R_2$, $R_3$, $R_4$, and X can be, independent of each other, an aryl group, an alkyl group, a $C_6$ to $C_{20}$ aryl or alkyl-substituted $C_6$ to $C_{20}$ aryl and n is 1 to 5. In various embodiments, n is 1.

In various embodiments, a polymer sheet of the present invention comprises a polyphosphate ester having structure II, wherein $R_1$, $R_2$, $R_3$, $R_4$, can be, independent of each other, an aryl group, an alkyl group, a $C_6$ to $C_{20}$ aryl or alkyl-substituted $C_6$ to $C_{20}$ aryl, X can be an aryl group, an alkyl group, a $C_6$ to $C_{20}$ aryl or alkyl-substituted $C_6$ to $C_{20}$ aryl, ethylene glycol, propylene glycol, or a polyester, and n is 1 to 5. In various embodiments, n is 1.

In various embodiments, a polymer sheet of the present invention comprises a polyphosphate ester having structure II, wherein $R_1$, $R_2$, $R_3$, and $R_4$ can be, independent of each other, a phenyl group or a xylyl group with at least one being a phenyl group and one being a xylyl group, n is 1 to 5, and X has the structure:

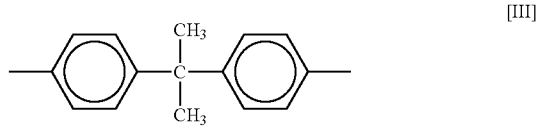

[III]

Specific examples of polyphosphate esters that are useful in the nonfluoropolymer polymer sheets of the present invention include, without limitation, polyphosphates having an aromatic ring such as hydroquinone bis(diphenyl phosphate), hydroquinone bis(dicresyl phosphate), hydroquinone bis(dixylyl phosphate), diphenol bis(dixylyl phosphate), resorcinol bis(diphenyl phosphate), resorcinol bis(dicresyl phosphate), resorcinol bis(dixylyl phosphate), bisphenol-A bis(diphenyl phosphate), bisphenol-A bis(dicresyl phosphate), bisphenol-A bis(dixylyl phosphate), and mixtures thereof.

In various embodiments of the present invention, higher order phosphates can be used as a plasticizer in a nonfluoropolymer polymer sheet at concentrations, for example, of 5-80 phr, 10-70 phr, 15-60 phr, or 20-50 phr. As indicated above, total plasticizer content can comprise two or more higher order phosphate esters.

In various embodiments, phosphate esters are used in combination with conventional plasticizers to form a plasticizer mix. In these combinations, the total plasticizer content can be 5-80 phr, 10-70 phr, 15-60 phr, or 20-50 phr, and the phosphate ester can comprise at least 10%, 20%, 30%, 40%, 50%, or 75% of the plasticizer mix on a weight per weight basis. Conventional plasticizers that can be used with the higher order phosphate ester plasticizers of the present invention include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In some embodiments, the plasticizer is triethylene glycol di-(2-ethylhexanoate).

In yet other embodiments, any of the interlayers of the present invention can be utilized in a "bilayer" construction. Such bilayer constructions typically comprise a glazing sheet, such as a pane of glass, an interlayer, and a polymer film, in that order. This construction, which lacks a second pane of glass, allows for a panel with lower overall thickness and weight. For example, a construct having the following layer arrangement can be formed: glass//fluoropolymer sheet//nonfluoropolymer polymer sheet//polymer film.

As used herein, a "fire resistant panel" is any of the glass//interlayer//glass constructs of the present invention where the interlayer comprises a fluoropolymer sheet/nonfluoropolymer polymer sheet interlayer. In various embodiments of the present invention, further conventional non-fire resistant layers, and, as described elsewhere herein, fire resistant layers, can be added to any fire resistant panels of the present invention.

In various embodiments of the present invention, an additional fire resistant layer can be disposed on the outside surface of a layer of glass in any of the fire resistant panels described herein. For example, a glass//interlayer//glass construct can include a further fire resistant layer on either exposed glass surface to yield a multiple layer glass panel with the following structure: glass//interlayer//glass//fire resistant layer. A further glass layer can be included, and, optionally, further fire resistant layer//glass layer iterations to form various fire resistant multiple layer glass panels, according to the following:

fire resistant panel//(fire resistant layer//glass layer)$_n$, where n is a whole number less than 10, the fire resistant panel is any fire resistant panel of the present invention, and the fire resistant layer in each n iteration can be any fire resistant layer described herein, wherein the fire resistant layers represented by n can be the same or different. In various embodiments, the fire resistant layer can comprise any of the fluoropolymer sheets, nonfluoropolymer polymer sheets having phosphate ester plasticizers, and intumescent layers, as described herein.

In further embodiments of the present invention one or more layers of intumescent material can be added to form multiple layer glass panels having additional fire retardant characteristics. These embodiments can be formed, for example, by adding a layer of intumescent material and a layer of glass to any of the above described embodiments for a multiple layer glass panel comprising an interlayer of the present invention. For example, one possible configuration is: glass//interlayer//glass//intumescent layer//glass. Of course more than one layer of intumescent material can be added, with additional vitreous layers incorporated as needed to separate the intumescent layers. Generally, a panel can be constructed with multiple intumescent layers having the design:

(glass panel comprising an interlayer of the present invention)//(intumescent layer//glass layer)$_n$, where n is a whole number less than 10.

The intumescent layers of the present invention can be manufactured and incorporated according to known techniques, and specifically by those described in U.S. Pat. Nos. 4,654,268; 4,485,601; and 5,434,006. The material used as the intumescent material can be any suitable material, including, but not limited to, hydrated metal salts, metal silicates, alkali metal silicates, and hydrated sodium silicate. In various embodiments the intumescent material is hydrated sodium silicate. In various embodiments, the hydrated sodium silicate has a weight ratio $SiO_2:N_2O$ of between about 3:1 and 4:1 or about 3.4:1, and can have, for example, from 25 to 40 or from 30 to 35 water as a weight percent.

In other embodiments of the present invention, a fluoropolymer//nonfluoropolymer sheet produced by well known coextrusion processes can be used in place of the fluoropolymer sheet//nonfluoropolymer polymer sheet two layer constructs disclosed herein. The coextrusion process can involve, for example, providing two polymer melts. The first polymer melt incorporates the components that are described else-where herein as part of a fluoropolymer sheet. The second polymer melt incorporates the components that are described elsewhere herein as part of a nonfluoropolymer sheet. The two melts are then coextruded to form a single sheet that has a fluoropolymer region and a nonfluoropolymer region that emulate a two layer fluoropolymer sheet//nonfluoropolymer sheet two layer construct. In further embodiments, three or more melts can be used to form a sheet having two or more fluoropolymer regions and/or two or more nonfluoropolymer regions.

The coextrusion sheets described in the preceding paragraph can be used in any of the constructs and methods of the present invention in place of multiple layer embodiments in which an analogous multiple sheet construct is used.

Glass panes of the present invention can be any that are conventionally used in the art of laminated glass panels, and specifically those that incorporate fire resistant properties or that are particularly suited for use with the intumescent layers described above, such as those described in U.S. Pat. No. 5,434,006. Particularly useful glass includes, but is not limited to: tempered glass, borosilicate glass, vitro-ceramic materials, vitro-crystalline materials, aluminosilicate, and alumino-boro-silicate glasses. Examples of compositions of an alumino-silicate and three alumino-boro-silicate gasses that can be used include the compositions listed in the following table (parts by weight):

| Component | Composition A | Composition B | Composition C | Composition D |
|---|---|---|---|---|
| $SiO_2$ | 62.8 | 69.5 | 73.25 | 70 |
| $Al_2O_3$ | 8.4 | 4.0 | 6.2 | 10 |
| $B_2O_3$ | 1.1 | 8.7 | 7.2 | 8 |
| $Na_2O$ | 11.7 | 9.3 | 8.1 | 8 |
| BaO | 2.4 | 5.5 | — | — |
| CaO | — | 3.0 | 3.4 | 3 |
| MgO | 4.4 | — | 1.7 | 1 |
| ZnO | 8.2 | — | — | — |
| $TiO_2$ | 0.6 | — | — | — |
| $As_2O_3$ | 0.4 | — | 0.15 | — |

Multiple layer glass panels of the present invention can generally be oriented with either side of the panel facing an internal space.

The present invention also includes windshields, windows, and other finished glazing products—specifically multiple layer glazing panels comprising any of the interlayers of the present invention.

Also included in the present invention are stacks or rolls of any of the interlayers of the present invention disclosed herein.

The present invention includes methods for manufacturing a multiple layer glass panel interlayer, comprising the steps of forming a stack comprising the individual layers of any of the interlayers described herein, and laminating the stack.

The present invention further includes methods of manufacturing a multiple layer glass panel by laminating any interlayer of the present invention with other layers, including glazing layers, using any appropriate conventional method, such as by an autoclave lamination process to produce any of the multiple layer glazing panels of the present invention.

The present invention also includes a method of preventing or reducing the spread of fire by affixing in an opening any of the multiple layer glass panels of the present invention.

Epoxide Agent

Epoxide agents can be incorporated into the layers of the present invention, and include 3,4-epoxycyclohexane carboxylate compositions of the type described in U.S. Pat. No. 3,723,320. Also useful are diepoxides such as those disclosed in U.S. Pat. No. 4,206,067 that contain two linked cyclohexane groups to each of which is fused an epoxide group. Such diepoxide compounds correspond to the formula:

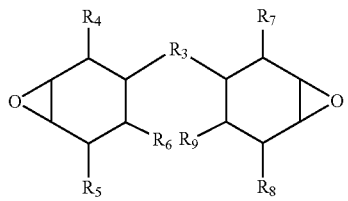

wherein $R_3$ is an organic group containing 1 to 10 carbon atoms, from 0 to 6 oxygen atoms, and from 0 to 6 nitrogen atoms, and $R_4$ through $R_9$ are independently selected from among hydrogen and aliphatic groups containing 1 to 5 carbon atoms. Exemplary diepoxides include 3,4-epoxycyclohexylmethyl-3,4-epoxycyclohexane, bis (3,4-epoxy-6-methylcyclohexylmethyl adipate), and 2-(3,4-epoxycyclohexyl)-5,5-spiro(3,4-epoxy)cyclohexane-m-dioxane.

Other useful epoxide agents include polyglycol di-epoxide agents, such as polymers of epichlorohydrin-polyglycol, for example DER 732. Such high molecular weight di-epoxides are useful because they typically have a relatively low volatility.

Other acid scavengers, alone or in combination with epoxide agents, as are known in the art, can be used in polymer sheets of the present invention.

Polymer Film

As used herein, a "polymer film" means a relatively thin and rigid polymer layer that functions as a performance enhancing layer. Polymer films differ from polymer sheets, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infra-red solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer sheet. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No. 0157030.

Nonfluoropolymer Polymer Sheet

The following section describes the various materials, such as poly(vinyl butyral), that can be used to form nonfluoropolymer polymer sheets of the present invention.

As used herein, a "nonfluoropolymer polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels that also contains no, or essentially no, fluorocarbon component. Plasticized poly(vinyl butyral) is most commonly used to form nonfluoropolymer polymer sheets.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, such as acetates, salts, and alcohols. As used herein, "melt" refers to a melted mixture of resin with a plasticizer and optionally other additives.

The nonfluoropolymer polymer sheets of the present invention can comprise any suitable polymer, and, in a preferred embodiment, as exemplified above, the nonfluoropolymer polymer sheet comprises poly(vinyl butyral). In any of the embodiments of the present invention given herein that comprise poly(vinyl butyral) as the polymeric component of the nonfluoropolymer polymer sheet, another embodiment is included in which the polymer component consists of or consists essentially of poly(vinyl butyral). In these embodiments, any of the variations in additives, including plasticizers, disclosed herein can be used with the nonfluoropolymer polymer sheet having a polymer consisting of or consisting essentially of poly(vinyl butyral).

In one embodiment, the nonfluoropolymer polymer sheet comprises a polymer based on partially acetalized poly(vinyl alcohol)s. In another embodiment, the nonfluoropolymer polymer sheet comprises a polymer selected from the group consisting of poly(vinyl butyral), polyurethane, polyvinyl chloride, poly(ethylene vinyl acetate), combinations thereof, and the like. In one embodiment, the nonfluoropolymer polymer sheet comprises poly(vinyl butyral). In other embodiments, the nonfluoropolymer polymer sheet comprises plasticized poly(vinyl butyral). In further embodiments the nonfluoropolymer polymer sheet comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in nonfluoropolymer polymer sheets.

For embodiments comprising poly(vinyl butyral), the poly(vinyl butyral) can be produced by known acetalization processes that involve reacting poly(vinyl alcohol) (PVOH) with butyraldehyde in the presence of an acid catalyst, followed by neutralization of the catalyst, separation, stabilization, and drying of the resin.

In various embodiments, the nonfluoropolymer polymer sheet can comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

For embodiments in which a nonfluoropolymer polymer sheet comprises poly(vinyl butyral), poly(vinyl butyral) having a residual poly(vinyl alcohol) content, by weight, of 5% to 50%, 10% to 50%, 11% to 40%, 15% to 30%, or 20% to 30%, can be used, although other ranges can be used as well. It is also advantageous in some applications to use poly(vinyl butyral) having a residual poly(vinyl alcohol) content, by weight, of greater than 25%, greater than 27%, or greater than 30%.

In various embodiments, the nonfluoropolymer polymer sheet comprises poly(vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350 g/mole (see, for example, U.S. Pat. Nos. 4,902,464; 4,874,814; 4,814,529; and, 4,654,179). As used herein, the term "molecular weight" means the weight average molecular weight.

Various adhesion control agents can be used in nonfluoropolymer polymer sheets of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate)(chemical abstracts number 79992-76-0). In various embodiments of the present invention the magnesium salt is magnesium bis(2-ethyl butyrate).

Other additives may be incorporated into the nonfluoropolymer polymer sheet to enhance its performance in a final product. Such additives include, but are not limited to, dyes, pigments, stabilizers (e.g., ultraviolet stabilizers), antioxidants, antiblock agents, IR absorbers, combinations of the foregoing additives, and the like, as are known in the art.

Any suitable method can be used to produce the nonfluoropolymer polymer sheets of the present invention. Details of suitable processes for making poly(vinyl butyral) are known to those skilled in the art (see, for example, U.S. Pat. Nos. 2,282,057 and 2,282,026).

The poly(vinyl butyral) polymer, plasticizer, and any additives can be thermally processed and configured into sheet form according to methods known to those of ordinary skill in the art. One exemplary method of forming a poly(vinyl butyral) sheet comprises extruding molten poly(vinyl butyral) comprising resin, plasticizer, and additives by forcing the melt through a die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet. In various embodiments, the nonfluoropolymer polymer sheets can have thicknesses of, for example, 0.1 to 2.5 millimeters, 0.2 to 2.0 millimeters, 0.25 to 1.75 millimeters, and 0.3 to 1.5 millimeters.

For each embodiment described above comprising a glass layer, another embodiment exists, where suitable, wherein a glazing type material is used in place of the glass. Examples of such glazing layers include rigid plastics having a high glass transition temperature, for example above 60° C. or 70° C., for example polycarbonates and polyalkyl methacrylates, and specifically those having from 1 to 3 carbon atoms in the alkyl moiety.

Various polymer sheet and/or laminated glass characteristics and measuring techniques will now be described for use with the present invention.

The clarity of a polymer sheet, and particularly a poly(vinyl butyral) sheet, can be determined by measuring the haze value, which is a quantification of light not transmitted through the sheet. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) sheet is then removed, and the amount of glass left adhered to the poly(vinyl butyral) sheet is visually compared with a set of standards. The standards correspond to a scale in which varying degrees of glass remain adhered to the poly(vinyl butyral) sheet. In particular, at a pummel standard of zero, no glass is left adhered to the poly(vinyl butyral) sheet. At a pummel standard of 10, 100% of the glass remains adhered to the poly(vinyl butyral) sheet. For laminated glass panels of the present invention, various embodiments have a pummel of at least 3, at least 5, at least 8, at least 9, or 10. Other embodiments have a pummel between 8 and 10, inclusive.

The "yellowness index" of a polymer sheet can be measured according to the following: Transparent molded disks of polymer sheet 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness.

By virtue of the present invention, it is now possible to provide interlayers and multiple layer glass panel comprising those interlayers having improved fire resistance characteristics.

Although embodiments of the present invention have been described in various embodiments, it will be clear to those of ordinary skill in the art that many other permutations are possible and are within the scope and spirit of the present invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeable with any ranges, values, or characteristics given for any of the other components of the invention, where compatible, to form an embodiment having defined values for each of the components, as given herein throughout. For example, an interlayer can be formed comprising a fluoropolymer sheet having any of the values given and a nonfluoropolymer polymer sheet comprising higher order phosphate esters in any of the ranges given, to form many permutations that are within the scope of the present invention.

Any figure reference numbers given within the abstract or any claims are for illustrative purposes only and should not be construed to limit the claimed invention to any one particular embodiment shown in any figure. Figures are not drawn to scale unless otherwise noted.

Each reference, including journal articles, patents, applications, and books, referred to herein is hereby incorporated by reference in its entirety.

We claim:

1. A multiple layer glass panel, comprising:
   a first pane of glass;
   a second pane of glass; and,
   a multiple layer glass panel interlayer, wherein said interlayer comprises:
   a fluoropolymer sheet having a thickness of 0.1 to 1.5 millimeters; and,
   a nonfluoropolymer polymer sheet comprising poly(vinyl butyral), wherein said interlayer is disposed between said first pane of glass and said second pane of glass.

2. The panel of claim 1, wherein said fluoropolymer sheet and said nonfluoropolymer polymer sheet are bonded together with an adhesive agent.

3. The panel of claim 2, wherein said adhesive agent comprises a silane or siloxane.

4. The panel of claim 1, wherein said fluoropolymer sheet comprises tetrafluoroethylene/hexafluoropropylene/vinylidene fluoride.

5. The panel of claim 4, wherein said fluoropolymer sheet comprises at least 75 weight percent of said tetrafluoroethylene/hexafluoropropylene/vinylidene fluoride.

6. The panel of claim 1, wherein said fluoropolymer sheet comprises an ethylene-tetrafluoroethylene copolymer.

7. The panel of claim 1, wherein said fluoropolymer sheet and said nonfluoropolymer polymer sheet are disposed in contact with each other.

8. The panel of claim 1, further comprising a polymer film disposed between said fluoropolymer sheet and said nonfluoropolymer polymer sheet.

9. The panel of claim 8, wherein said polymer film comprises poly(ethylene terephthalate).

10. The panel of claim 1, wherein said nonfluoropolymer polymer sheet comprises a phosphate ester plasticizer.

* * * * *